United States Patent [19]

King

[11] 4,037,787

[45] July 26, 1977

[54] METHOD OF SUPPLEMENTAL IRRIGATION FOR FARMING

[76] Inventor: Harry A. King, 19361 Trino Circle, Yorba Linda, Calif. 92686

[21] Appl. No.: 678,249

[22] Filed: Apr. 19, 1976

[51] Int. Cl.² .................. E01H 13/00; A01G 13/06
[52] U.S. Cl. .......................................... 239/2 R; 47/2
[58] Field of Search ............................. 47/2; 239/2 R

[56] References Cited

U.S. PATENT DOCUMENTS

| | | | |
|---|---|---|---|
| 661,898 | 11/1900 | Tucker | 47/2 |
| 1,111,993 | 9/1914 | Carder | 47/2 |
| 1,993,635 | 3/1935 | Towt | 47/2 |
| 3,055,144 | 9/1962 | Johnson et al. | 47/2 |
| 3,067,541 | 12/1962 | Smith | 47/2 |
| 3,314,191 | 4/1967 | Darr | 47/2 |
| 3,788,542 | 1/1974 | Mee | 47/2 X |
| 3,841,558 | 10/1974 | Fowler et al. | 47/2 X |

*Primary Examiner*—Robert E. Bagwill
*Attorney, Agent, or Firm*—Donald D. Mon

[57] ABSTRACT

A method of supplemental irrigation of substantial areas, for supplying water to plants and for conserving water already in the plants and in the soil, by placing in the atmosphere over the area a fog of water particles which particles are of a size such that they tend to settle rather slowly. They will thereby have a residence time in the air around the plants, and can drift appreciable distances with slow air movement. According to the preferred method, the majority of the droplets will have a diameter between about 10 and about 200 microns, the mass median diameter being about 50 microns. The method comprehends generating this fog and, if necessary, blowing it to areas which require it.

4 Claims, No Drawings

METHOD OF SUPPLEMENTAL IRRIGATION FOR FARMING

There are three general methods of applying water to croplands—surface irrigation, sprinklers or overhead irrigation, and subsurface irrigation. In all of these methods the aim is to apply adequate water for plant growth to the soil uniformly over the whole field with no harm to the crop or soil and using a minimum of water and labor. Each of these methods has advantages and disadvantages. These are presented here to more clearly show how this new method differs from these traditional methods.

In surface irrigation, the water may be applied to completely cover the surface (commonly called flood irrigation) or it may flow in furrows or small ditches. Either technique may be used on sloping or relatively flat lands. Either method can apply a fairly closely controlled amount of water to a given area. To do so, however, requires close control over the rate of addition and a precise leveling or slope control of the land. They also generally require the use of farming practices that leave the dikes intact so the boundaries or dikes don't have to be constantly rebuilt. These techniques also require a reasonable range of water intake into the soil. Too slow or too rapid an intake is not suitable for surface irrigation. Knowledge of the soil's characteristics is also important to prevent carrying the nutrients below the root zones or raising the water table to the point where root growth is stopped.

Sprinkler or overhead irrigation is adaptable to most soils and crops. It provides excellent control of the water and can be turned off when the soil has absorbed the required amount. Sprinklers require considerably less land smoothing than surface irrigation. However, they require a very high initial investment for the many sprinkler heads and pipes—usually one every 10 to 50 feet. Power requirements are also high to pressurize the large volume of water through the many pipes and nozzles. Wind can cause uneven distribution. Labor requirements are also usually high to move the pipes for cultivation and keep the nozzles working well. Accordingly sprinklers are seldom used for large areas.

In subsurface irrigation, an artificial water table is created and maintained at a predetermined depth below the surface but within reach of the plant roots. Moisture is supplied to the plant roots through upward capillary movement. In this method the water depth must be controlled carefully; otherwise the depth becomes too high or too low, retarding or stopping root growth. Special provision may also be necessary to provide enough surface water to start seedlings, perhaps requiring the temporary use of sprinklers or local surface irrigation. This method can be used effectively on soils that are difficult and expensive to irrigate by other methods. If tiles or pipes are required, however, this can be a very expensive method to install. It may be inexpensive, though, if the water is simply applied at selected points. Its main limitation is the unusual comination of natural conditions required. Also, only water of good quality should be used since soils may become saline unless careful control is exercised. Also, high levels of fertility may be hard to maintain. In addition, when the underground water contains appreciable quantities of salt, an impervious layer of salt tends to develop and may retard movement of water.

Some irrigation systems are better adapted to growing certain types of crops than others. Close-growing crops such as alfalfa and pastures are usually flood irrigated. Row crops, like corn, cotton, and sugar beets are furrow irrigated. Rotation from row to cover crops is common, however, and plans must usually be made to irrigate by more than one method with its corresponding increase in cost.

In large areas of the world, however, no irrigation is practical because of unsuitable soil or terrain or farming methods or lack of resources to purchase the necessary equipment or labor to apply and maintain it once purchased.

The "irrigation" method described here is quite different in intent from the three traditional methods, being aimed specifically at those farms where these other methods are not practical for one or more reasons. It, however, is not intended to supply all of the water required to sustain plant growth as can the current methods. Rather, it is intended as a rain supplement and to reduce the amount of water currently withdrawn from the soil by the plant so that what is there will last longer. It also tries to provide a more uniform and consistent growing environment for the plants, in effect trying to approach the ideal conditions of a greenhouse over very large areas. However, because of its low initial cost, its low use of water, and its low upkeep it is intended to provide many of the advantages of an irrigation system and greenhouse to farms which cannot presently afford or utilize the more demanding irrigation systems.

This system presents a technique for distributing water over substantial areas—typically 40 to 160 acres-—from one to nine central distributing points. It is based on the fact that as water droplets get smaller they will stay in the air for longer and longer periods of time and if given motion can travel for quite long distances before coming to earth.

If the production of these fine droplets is combined with a method of moving and directing them—such as with a movable fan, blower, or nozzle—the water can be transported for hundreds of feet before reaching earth as liquid water or as an increased humidity.

These problems suggest themselves in attempting to use such an approach. First, can such a technique be used with a wind is blowing; second, if it is warm and dry, won't most of the water be lost; and third, can enough water be applied to do any good. Each of these "problems" is discussed in the following sections.

Concerning the effect of wind, it will certainly cause small water droplets to go for longer distances and perhaps in different directions than expected. This problem can be controlled in two ways—first, on days or nights of strong, gusty winds by simply turning off the "fog" generator if the water is going where it is not wanted. Second, distance of travel can be quite closely controlled by controlling the size of the water droplets being manufactured as indicated in Table 1.

TABLE 1

Particle Size vs Time and Distance of Water Droplet Fall

| Particle Size, Median Volume (microns) | Time For Particle To Fall 10 Feet (seconds) | Drift in 3 mph Wind with a 10 Foot Fall (feet) |
|---|---|---|
| 5000 | 0.85 | 3.5 |
| 2000 | 0.9 | 4 |
| 1000 | 1.1 | 5 |
| 500 | 1.6 | 7 |
| 100 | 11 | 48 |
| 50 | 40 | 175 |
| 10 | 1020 | 4500 |

TABLE 1-continued

Particle Size vs Time and Distance of Water Droplet Fall

| Particle Size, Median Volume (microns) | Time For Particle To Fall 10 Feet (seconds) | Drift in 3 mph Wind with a 10 Foot Fall (feet) |
|---|---|---|
| 2 | 25400 | 112000 |

1 Micron equals 1/25,400 of an inch. A rain particle during a heavy rain is typically 1000 to 5000 microns in diameter. During a light rain a drop size will typically be in the 100 to 500 micron range. A wet fog will usually have droplets in the 10 to 50 micron range while a dry fog droplet will usually average between 2 and 10 microns. Most sprinklers are designed to produce fairly coarse droplets—usually in the 500 to 5000 micron range.

It can be seem from the data in this table that by controlling water particle size, utilizing air velocity—whether from natural or artificial sources, and droplet distance of fall, droplet drift or movement can be controlled quite closely. Further, if the water droplet generator produces a moderate variation in the size of the droplets produced—as shown for a typical hydraulic atomizing nozzle in Table 2—the water droplets will fall to earth fairly uniformly from the drop generator to the distance predicted in Table 1 for the minimum size produced.

TABLE 2

Typical Droplet Diameter Distribution for a Spray Nozzle Set for a Median Droplet Diameter of 120 Microns

| Droplet Diameter (microns) | Cumulative Volume Percent |
|---|---|
| 25 | 1 |
| 60 | 10 |
| 90 | 30 |
| 120 | 50 |
| 150 | 70 |
| 200 | 90 |
| 300 | 99 |

The new "irrigation" method described here requires a droplet generator which produces a range of particle sizes somewhat similar to that shown in Table 2 (except it is preferred that the median droplet diameter be closer to 50 microns than the 120 microns shown in this Table) so water droplets will be applied over a substantial area at one time as the consequence of a suitable air movement. It is also desirable to be able to control median drop diameter so that the spray can be made to cover the desired area under differing air movement rates.

Concerning the second potential problem area of application of the fine drops when it is warm and dry—usually the conditions when supplemental irrigation is most desired—this is handled with this method in two ways. First, this is not recommended as a system which is to be used for a few hours every 2 or 3 weeks to add water to the soil when the plants have almost reached the wilting stage for lack of water as often occurs with the usual irrigation systems. It is rather a system which is to be in use for all or much of the 24 hour period of the day and which may stay on for all but periods of rain and shortly thereafter throughout the entire growing season. It should be realized that for optimum growing conditions the ground should not be allowed to become dry between waterings and then soaked. Rather, it should be kept moist (not wet) all the time. The exceptions to this are that if rain is expected, it may be desirable not to water for a day or two in order that the soil will absorb more of the rain more quickly and not cause runoff or caking, or if water is being withheld to limit vegetative growth and throw the plant into the reproductive stage and encourage a large seed set.

It is assumed that warm, dry weather will cause many of the fine drops of water to evaporate and hence fewer of them will reach ground. If one looks at the average time-temperature cycle of a day it will be seen that the maximum temperature and minimum humidity—the time when most evaporation will take place—typically occurs between 11AM and 3PM and is usually at a maximum about 2PM. On the other hand the minimum temperature and maximum humidity—the time of least water loss by evaporation-usually occurs between sundown and sunup with the lowest temperature occuring just before sunrise. This is also the time when the wind is usually at its lowest. Therefore, if the maximum of water on the ground by this irrigation method is desired, then the night is the period when the system would be used. During this same period, the ground is giving up its heat aquired during the day to the sky, dropping significantly in temperature. Often, if the dew point is exceeded during this time natural air bourne water vapor will condense out from the air as dew. Application of fine water droplets at this time would enhance this natural water drop (or dew fall) by increasing the local humidity and providing nuclei for the dew to condense on. Thus, at this time, more water may arrive at the ground then is being supplied by the irrigation system. Further, because many of the fine droplets will attach themselves to, or condense on, the plant leaves and then run down the stem or drop from the leaves onto the ground, the water will be placed precisely where it is needed most—right where the roots are—not indiscriminately over all the ground.

The technique of using dew to water plants is not new, having been used for centuries by farmers in the mid-east desert regions. Here rocks are usually piled around the base of each tree in an orchard. These rocks act as condensation points for the dew, the evening dew condensing on the rocks and running down to the ground to water the tree. Often this is the only water the tree will get. In the method described here, the amount of water available to condense is drastically increased.

When discussing this new type of irrigation, it is again pointed out that this is not intended to be a prime irrigation method for use where crops have not been grown before. Rather, it is a supplement to rain or standard irrigation to achieve more nearly optimum growing conditions for the plant and to tide the plants over for a period when the rain storms are farther apart than usual.

An interesting side advantage of this system of "artificial dew" at night is that its use in the spring or fall of the year should significantly reduce frost damage since such damage usually occurs on clear, cold nights when the soil can lose its heat to the sky rapidly allowing it to drop in temperature to the freezing point. By placing an artificial fog between the sky and the earth, soil heat loss will be drastically reduced increasing night time plant temperatures.

During the days of a hot, dry period the effect of the fine irrigating spray is quite different. However, in order to understand this, the way a plant grows and uses water must first be understood. Many people believe that life originated in the sea. The relationship of primordial life to water therefore was direct and relatively simple. When the terrestrial forms of life developed, water supply became a critical factor, and plants underwent profound changes in structure during the long process of adapting themselves to living on land.

With the development of land forms, the parts of the plant that are exposed to the air became dessicated by the evaporation of water from the cells. This evaporation from plants is called transpiration. By far the greatest portion of the water taken up by the roots of the plant is lost by transpiration. For every pound of dry matter in the plant there is commonly about 5 to 10 pounds of water. Yet for each pound of dry matter produced, the plant must absorb several hundred pounds of water; the difference between the 5 or 10 pounds and the several hundred pounds represents water lost by transpiration. By contrast, the aquatic plant has to absorb only the water required for its growth, that is, the 10 or so pounds per pound of dry matter constituting the plant body. It is evident, therefore, that land plants must have efficient means for absorbing water, for distributing it throughout the plant, and for controlling water loss as much as possible. Because most of the water used by land plants must be absorbed from the soil in which they grow, root systems must be extensively developed.

Since transpiration is the key process in utilization of water by plants, the factors governing it are important. Transpiration involves the evaporation of water in the airspaces in the leaves and its diffusion out into the surrounding atmosphere. Within the leaf, air spaces are nearly saturated with water vapor. Diffusion into the surrounding air, which is primarily through the stomates, is proportional to the difference in concentration of water vapor between the leaf spaces and the air around the leaf. Other factors being equal, therefore, the lower the water content, or relative humidity, of the air, the more rapidly will water be transpired.

As leaves absorb solar radiation, they tend to become warmer than the air, the temperature difference frequently being as much as 5° to 10° F.

The amount of water that can be held by saturated air increases as the temperature increases. Warming of the leaf by the sun's rays, therefore, increases the amount of water in the in the leaf and favors even more rapid water loss.

It is not surprising, therefore, that the rate of transpiration follows a daily cycle that tends to parallel light intensity. By far the greatest portion of water is lost during the daylight hours, and the rate of loss is most rapid during the middle of the day.

From this discussion, it is obvious that anything that can be done to maintain a high humidity around the plant, the less water that will be lost in transpiration, and hence, the longer the water that is stored in the ground will last. Thus the application of a fine spray of water during the day, even if it is entirely lost by evaporation near the ground, is not lost to the plant and saves water stored in the ground just as though it were applied directly to the soil as liquid water. Further, because many of the fine water droplets will land on the plant leaves prior to evaporation, and some will then evaporate from there to become water vapor, during the evaporation the leaf will be cooled, further lowering its demand for water. Accordingly loss of some, or even all, of the "fog" applied during the day by evaporation will not result in its loss of effectiveness from the field. Certainly some will be lost as is the case with all water applications, but the amount need not be great if properly controlled.

Timing of water applications to plants can be of great importance in obtaining maximum yields if the previously mentioned "constantly moist" soil approach is not used or cannot be maintained. Annual crops have small water requirements while they are still young and small. At the time the roots are limited to a small volume of soil so that the soil needs frequent but light irrigations. The young plants are especially sensitive to a shortage of water at this stage of growth and even short periods of drought can retard growth so seriously that the plants can never catch up to those that did not so suffer. Many crops, such as corn and grain show a second peak of sensitivity at the time they set seeds. Nearly all crops can stand low moisture during maturation and ripening without serious damage to yield, but nearly all such crops will be retarded in vegetative growth by low moisture.

There are several possible ways of obtaining fine drop sizes in good yield with a good spread in size. Test work to date has indicated that the desired droplet size range to successfully use this technique is with a majority of the droplets between 10 and 200 microns in diameter and with a mass median diameter of approximately 50 microns. One device that appears to provide the desired median size and size spread with a minimum of complications is the hydraulic atomizing nozzle operating at low capacity (1 to 10 gallons/hour/nozzle) and high pressure (50 to 1000 psig.) Such a system, by changing pressures, permits a controllable variation in average droplet diameters as indicated in Table 3. The capacity of such nozzles also varies with pressure as typically indicated in Table 4. As can be seen in this Table, higher pressures result in larger throughputs as well as smaller droplet sizes but at a greater expense in pumps and energy.

TABLE 3

The Effect of Nozzle Pressure on Median Droplet Diameter

| Nozzle Pressure (psig) | Approx. Mass Median Droplet Diameter (microns) |
|---|---|
| 20 | 160 |
| 50 | 105 |
| 100 | 90 |
| 200 | 70 |
| 500 | 50 |
| 1000 | 40 |

TABLE 4

The Effect of Nozzle Pressure on Nozzle Capacity For a Particular Hydraulic Spray Nozzle

| Nozzle Pressure (psig) | Capacity (gallons per hour) |
|---|---|
| 30 | 3.5 |
| 40 | 4.0 |
| 60 | 4.9 |
| 100 | 6.3 |
| 200 | 9.0 |
| 300 | 11.0 |
| 500 | 14.2 |
| 700 | 16.7 |
| 1000 | 20.0 |

Concerning the potential problem of whether enough water can be applied in such small droplets from 1 or more spray points to do any good on a large farm, 100 nozzles of the type described in Table 4 (not a difficult number to gang into one manifold), operating at 500 psig for 24 hours would make available approximately 850 gallons of water per acre per day on a 40 acre area from one spray point. While this is not enough to supply all the water needs of the plants (which may require 3000 gal./acre/day under normal growth conditions and perhaps 6000 gal./acre/day under maximum water use conditions), by lowering the amount of water transpired because of higher humidity and adding at least a good portion of this amount as liquid water, it would certainly be significant in reducing water demands on the soil. Further, costs would still be low even if a second or third spray point were added because of the overall simplicity of the system.

Other types of spraying devices are also available which can provide large quantities of small particle size although these are typically more complex and expensive. Included here would be rotary and vibratory nozzles and air atomizing nozzles. Other techniques might be to use nozzles which generated large quantities of large size drops then using heat or other means to break these up into smaller droplets.

It is interesting to note the number of water droplets that would be available on a given square inch of land area using these fine water droplets. This relationship is presented in Table 5.

TABLE 5

Number of Water Droplets vs Droplet Size

| Droplet Size (microns) | Number of Droplets/Sq. Inch of Land If Applied at the Rate of 1 Gal/Acre |
|---|---|
| 1000 | 1 |
| 500 | 9 |
| 100 | 1152 |
| 50 | 9200 |
| 10 | 1152500 |

As previously indicated, the mechanical requirements for this new type of "irrigation" system are simple and low cost. Each spray station with its manifolded spray heads would consist of a simple air mover such as a fan, a hydraulic pump to pressurize the water, and the spray heads, the whole mounted on a simple stationery or mobile platform.

The system can be designed to apply water fairly uniformly over a large area without existing ground contours affecting application significantly. Because it applies the water at a low rate, the effect of soil variation is minimized. By increasing humidity around the plants their soil water requirements should be significantly reduced. If fertilizers or insecticides are added to the water prior to spraying they can be applied at the same time with little equipment efficiently and thoroughly.

The method of this invention comprises the supplying of water to the plant and to the soil and conservation of water already in the plant and in the soil by placing in the atmosphere around the plants a fog of water particles of size such as to settle rather slowly, whereby to have a residence time in the air around the plant, and to drift appreciable distances with slow air movement. According to the preferred method, the majority of the droplets have a diameter between about 10 and about 200 microns, the mass median diameter being about 50 microns. The method comprehends generating this fog and, if necessary, blowing it to areas which require it. Inherent in the method is the maintenance of a more humid atmosphere which inhibits transpiration and at night insulates the ground from the atmosphere to inhibit heat loss from the ground and from the plant. The preferred method involves maintaining the soil in a moist condition. The term "fog" is used to connect the water particle sizes and distributions disclosed herein. The term includes "mists" to the extent that a mist has water particles of similar size and distribution.

It is interesting to observe the rate of lateral movement of the fog over the surface of the land as the consequence of its movement by a blower. The initial velocities quite close to a blower have rather little direct relationship to the rate of movement rather far from it. It is simple to attain face velocities on the order of 1 to 100 feet per second by fans and propellers, and even as high as 600 mph by jet or rocket blast. But about 10 to 100 feet from the fan or other impelling means, in all systems the mist flow seems to be between about 1 to 5 mph (1.5–7.5 feet per second). In general, it appears that a mass flow of air with a velocity along the ground between about 1 to 5 mph over the major part of the irrigated area, a reasonable distance from the impeller, such as 10 feet or so, is useful and preferable. The term "impeller" means any device or method to move the fog-laden air laterally above the ground.

The velocities and quantities of water emitted and the elevation above the ground that the water is emitted, are selected so that a substantially uniform density of deposition of water per square foot results at locations a few feet from the emitter, and at a substantial distance away from it. This system is not intended to resemble a typical fine-spraying hose-end water sprinkler, for example, which waters an area within a very few feet by direct "rainfall type" application. Such sprinklers and their methods are intended for small area intermittent watering. This system is intended to supplement other irrigation, and to provide supplemental moisture at least several feet away from the emitter, so that a single emitter could, with a rotating fan, readily serve a circular pattern having a radius of 500 to 1000 feet and perhaps larger.

This invention is not to be limited to the precise embodiments disclosed herein, which are given by way of example and not of limitation, but only in accordance with the scope of the appended claims.

I claim:

1. The method of supplying water to plants and conserving water already in the plant and in the soil comprising: placing in the atmosphere around the plant a fog of water droplets, the majority of which droplets having a diameter between about 10 and about 200 microns, substantially all of which droplets have a diameter no greater than 300 microns, the mass median diameter of all droplets being about 50 microns, whereby the droplets evaporate at a moderate rate and drift substantial distances with slow air movement before reaching the ground, whereby to cover a substantial area of ground with water.

2. The method according to claim 1 in which the droplets are emitted from a source above the ground, and in which they are blown by impeller means to distribute them in a desired direction.

3. The method according to claim 2 in which the droplets are impelled to move as a fog between about one to about five miles per hour beyond about 10 feet from a means for impelling its said movement.

4. The method according to claim 1 in which the fog is supplied at such intervals and in such quantities as to maintain the soil at the plant in a moist condition.

* * * * *